June 5, 1962     E. LORETAN     3,037,824
SHOCK-ABSORBING BEARING, NOTABLY FOR A MOVABLE
PART OF A SMALL MECHANISM
Filed May 19, 1960

INVENTOR
EDOUARD LORETAN
BY John B. (signature)

ATTORNEY

United States Patent Office 3,037,824
Patented June 5, 1962

3,037,824
SHOCK-ABSORBING BEARING, NOTABLY FOR A MOVABLE PART OF A SMALL MECHANISM
Edouard Loretan, Le Sentier, Switzerland, assignor to Parechoc S.A., Le Sentier, Switzerland
Filed May 19, 1960, Ser. No. 30,365
Claims priority, application Switzerland May 19, 1959
3 Claims. (Cl. 308—159)

This invention relates to a shock-absorbing bearing, notably for a movable element of a small mechanism, comprising a bearing support, a bearing body which includes a pivot bearing and which is axially and radially movable in a cylindrical housing formed in said support, one of the two elements, i.e. the bearing support or the bearing body, defining a frusto-conical seat with which co-operates, under the action of resilient means, an annular bearing surface provided on the other element to ensure centering of the bearing body.

This bearing is characterized by an intermediate part arranged between the resilient means and the bearing body, said intermediate part having a cylindrical portion by which it is guided without rocking in the housing and a flat bearing surface, which is normal to the axis of the bearing, for supporting the intermediate part on the bearing body, the arrangement being such that the bearing body is prevented from rocking and maintains its axis parallel to itself during displacement.

The accompanying drawings illustrate by way of example, one constructional form of the subject of the invention.

Figure 1:
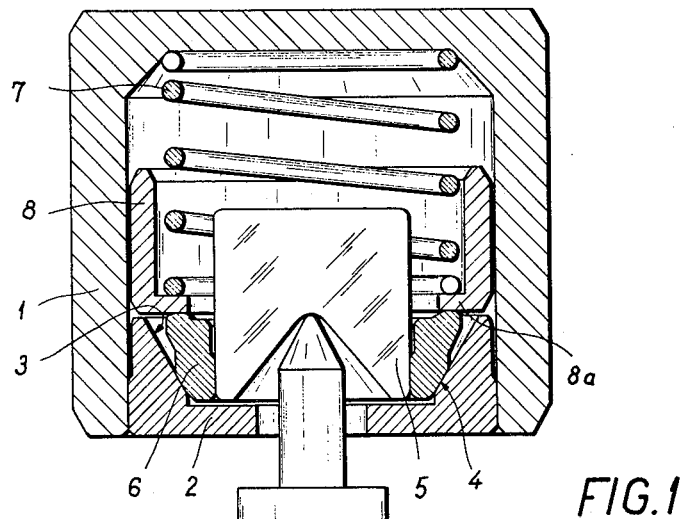
FIGURE 1 is an axial section through a shock-absorbing bearing for the movable element of a measuring apparatus.

The illustrated bearing comprises a support 1, in the form of a cup-shaped casing, which is intended to be driven into the framework of the apparatus in which the bearing is to be mounted. The open end of the casing 1 is provided with a force-fitted annulus 2 defining a frusto-conical seat 3 supporting the bearing surface 4 of a bearing body comprising a pivot bearing 5 and a bevel 6. The surface 4, which is of sphere segment form, is arranged on this bevel. The bearing body may move axially within the casing 1.

A coiled compression spring 7 is housed in the casing 1 and acts on the bottom of the latter at one end and at the opposite end acts on the bearing body via the bottom 8a of a bush 8 which is mounted in the casing 1 so as to slide freely therein but with only limited play. The bottom 8a of the bush 8 is formed with a central hole through which extends the pivot bearing 5. This hole is sufficiently large to permit lateral displacement of the pivot bearing. The outside face of the bottom 8a, which is flat and perpendicular to the axis of the bearing, bears on the bevel 6 under the action of the spring 7.

The bearing body may move axially and radially in the casing 1, but is prevented from rocking by the bush 8 which ensures an even distribution of the pressure exerted by the spring 7 around the entire periphery of the bevel 6. In bearings which are similar but which lack an intermediate part between the spring and the bearing body, the latter rocks and the terminal convolutions of the spring are consequently deformed to follow the bearing body. It has been found that, contrary to what might be expected, the pressure exerted by the spring is stronger at the lowermost position of the bearing body than at the uppermost position of the latter. This difference in the pressure exerted by the spring accentuates still further the rocking displacement of the bearing body.

Figures 2, 3:
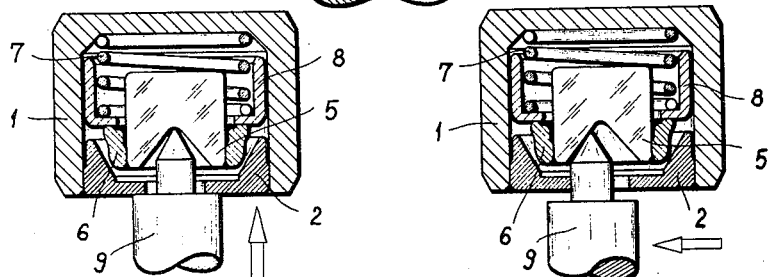
FIGURES 2 to 4 are similar sections on a reduced scale, showing the position of the movable parts of the bearing when the shaft is subjected to shocks acting in different directions.

In FIGURE 2, the bearing is shown after the shaft 9 has been subjected to a wholly axial shock. The bevel is lifted off the seat 3 of the bearing support.

In FIGURE 3, the shock is wholly lateral. The bearing body is moved sideways without rocking.

Figure 4:
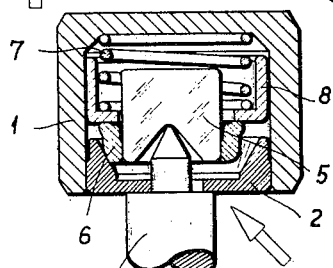

In FIGURE 4, the shaft is subjected to a shock which is both axial and lateral. This results in the bearing body being displaced by a combination of the movements represented in FIGURES 2 and 3.

What I claim is:

1. In a shock-absorbing bearing, notably for the movable element of a small mechanism, of the type comprising a bearing support provided with a cylindrical recess formed therein, a bearing body, including a pivot bearing, axially and radially movable in the said recess, and a resilient means located in the said recess, acting on said bearing body, one of said both elements—bearing support and bearing body—being provided with a frusto-conical seat and the other element being provided with an annular bearing surface, said seat and surface cooperating one with another under the action of the said resilient means for ensuring centering of the said bearing body, in such a shock-absorbing bearing: a cylindrical bush freely mounted, with only little lateral play, in the said recess, between the said resilient means and the said bearing body, a bottom of the said bush, normal to the axis of the said bearing, said bottom being provided with a central hole through which extends the said pivot bearing, and an annular outer shoulder of the said bearing body, on which bears the said bottom, whereby the said bearing body is prevented from rocking and maintains its axis parallel to itself during displacement.

2. In a shock-absorbing bearing, notably for the movable element of a small mechanism, of the type comprising a bearing support provided with a cylindrical recess formed therein, a bearing body, including a pivot bearing, axially and radially movable in the said recess, and a resilient means located in the said recess, acting on said bearing body, one of said both elements—bearing support and bearing body—being provided with a frusto-conical seat and the other element being provided with an annular bearing surface, said seat and surface cooperating one with another under the action of the said resilient means for ensuring centering of the said bearing body, in such a shock-absorbing bearing: a cylindrical bush freely mounted, with only little lateral play, in the said recess, between the said resilient means and the said bearing body, a bottom of the said bush, normal to the axis of the said bearing, said bottom being provided with a central hole through which extends the said pivot bearing, and an annular bevel in which is forced the said bearing body, and on which bears the said bottom, whereby the said bearing body is prevented from rocking and maintains its axis parallel to itself during displacement, said bevel being provided with the said centering surface.

3. In a shock-absorbing bearing, notably for the movable element of a small mechanism, of the type comprising a bearing support provided with a cylindrical recess formed therein, a bearing body, including a pivot bearing, axially and radially movable in the said recess, and a resilient means located in the said recess, acting on said bearing body, one of said both elements—bearing support and bearing body—being provided with a frusto-conical seat and the other element being provided with an annular bearing surface, said seat and surface cooperating one with another under the action of the said resilient means for ensuring centering of the said bearing body, in such a shock-absorbing bearing: a cylindrical bush freely mounted, with only little lateral play, in the said recess, said resilient means, constituted by a coil-spring, being partly located in the said bush, a bottom of the said bush, normal to the axis of the said bearing, said bottom being provided with a central hole through which extends the said pivot bearing, and an annular outer shoulder of the said bearing body, on which bears the said bottom, whereby the said bearing body is prevented from rocking and maintains its axis parallel to itself during displacement.

References Cited in the file of this patent

UNITED STATES PATENTS

| | | |
|---|---|---|
| 1,843,868 | Copelin | Feb. 2, 1932 |
| 2,919,961 | Matthey | Jan. 5, 1960 |

FOREIGN PATENTS

| | | |
|---|---|---|
| 1,185,741 | France | Feb. 16, 1959 |